United States Patent
Sivaramamurthy et al.

(10) Patent No.: US 9,678,748 B2
(45) Date of Patent: Jun. 13, 2017

(54) METHODS, SYSTEMS AND COMPUTER-READABLE MEDIA FOR MANAGING A LOCAL STACK

(71) Applicant: Infosys Limited, Bangalore (IN)

(72) Inventors: Venkat Kumar Sivaramamurthy, Bangalore (IN); Karthik Gopalakrishnan Vinmani, Bangalore (IN)

(73) Assignee: Infosys Limited, Bangalore (IN)

(*) Notice: Subject to any disclaimer, the term of this patent is extended or adjusted under 35 U.S.C. 154(b) by 141 days.

(21) Appl. No.: 14/493,722

(22) Filed: Sep. 23, 2014

(65) Prior Publication Data
US 2015/0169469 A1    Jun. 18, 2015

(30) Foreign Application Priority Data
Dec. 17, 2013   (IN) ............................ 5874/CHE/2013

(51) Int. Cl.
*G06F 9/00*           (2006.01)
(52) U.S. Cl.
CPC ...................................... *G06F 9/00* (2013.01)

(58) Field of Classification Search
CPC ............... G06F 17/24; G06F 17/30899; G06F 17/30873; G06F 17/30876; G06F 17/30905; G06F 9/4443; G06F 9/00
See application file for complete search history.

(56) References Cited

U.S. PATENT DOCUMENTS

| | | |
|---|---|---|
| 6,978,445 B2 | 12/2005 | Laane |
| 8,281,259 B2 | 10/2012 | Milic-Frayling et al. |
| 2004/0236859 A1* | 11/2004 | Leistad ............... H04L 12/1881 709/230 |
| 2005/0197141 A1 | 9/2005 | Jiang et al. |
| 2012/0036324 A1 | 2/2012 | Grunberger |
| 2014/0372715 A1* | 12/2014 | Bak ....................... G06F 12/126 711/158 |

* cited by examiner

*Primary Examiner* — Zhuo Li
(74) *Attorney, Agent, or Firm* — Klarquist Sparkman, LLP

(57) ABSTRACT

The technologies provide a method and system for managing a local stack in an information processing environment. In accordance with a disclosed embodiment, the method may include classifying a type of a page as one or more of a permanent entry, a transient entry, a combination entry and a null entry. Further, the method can include storing the page in the local stack for a definite period based on the type of the page. A usage of the local stack can be determined based on an action performed on the page within the information processing environment.

14 Claims, 4 Drawing Sheets

METHODS, SYSTEMS AND COMPUTER-READABLE MEDIA FOR MANAGING A LOCAL STACK

FIELD

The field relates generally to stack management in information systems. More specifically, the present invention relates to a method and system managing a local stack.

BACKGROUND

Existing systems of stack management have no intelligence and context associated in handling pages of a local stack. Usual practice is to push the pages into the local stack and pop them out for display. Due to poor stack management of pages in a local device of an application; a user may have to enter a back button multiple times. A disadvantage of such systems is excess usage of runtime memory, as unwanted entries tend to be maintained in the stack. Further, transient workload and overhead communication between a server, hosting a set of pages of the stack, and the local device, increases during processing of the application.

There is a need for a system and method that can perform stack management taking into account the user's need and application usage context, thereby allowing the stack to be managed in an optimal and contextual way. The alternate system and method must improve the user's experience by avoiding multiple key entries of the back button. Thus an optimized system and method for managing the local stack is proposed.

SUMMARY

The present invention provides a method and system for managing a local stack of an application being run on a portable device. In accordance with a disclosed embodiment, the method may include classifying a type of a page as one or more of a permanent entry, a transient entry, a combination entry and a null entry. Further the method can include, storing the page in the local stack for a definite period based on the type of the page. A usage of the local stack can be determined, based on an action performed on the page.

In an additional embodiment, a computer program product, for managing a local stack has been proposed. In accordance with a disclosed embodiment, the computer program product may include classifying a type of a page as one or more of a permanent entry, a transient entry, a combination entry and a null entry. Further the computer program product can store the page in the local stack for a definite period based on the type of the page. A usage of the local stack can be determined, based on an action performed on the page.

These and other features, aspects, and advantages of the present invention will be better understood with reference to the following description and claims.

While systems and methods are described herein by way of example and embodiments, those skilled in the art recognize that systems and methods for managing a local stack are described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

Disclosed embodiments provide computer-implemented methods, systems, and computer-program products for stack management in processing an application. More specifically the methods and systems disclosed manage a local stack of the application.

Figure 1:
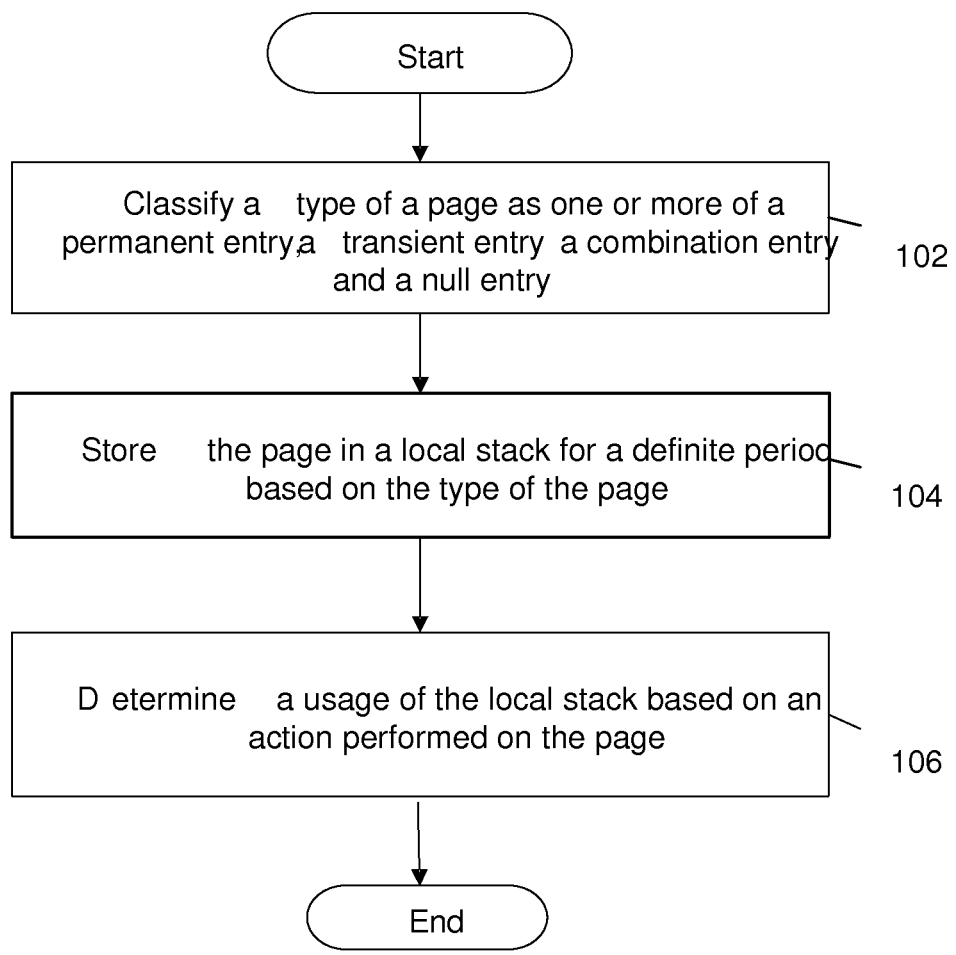
FIG. 1 is a flowchart illustrating an embodiment of a method for managing a local stack.

FIG. 1 is a flowchart that illustrates a method performed for managing a local stack in accordance with an embodiment of the present invention. At step 102, a type of a page, to be accessed for an application being run on a portable device such as a mobile handset, can be classified as a permanent entry, a transient entry, a combination entry or a null entry. The page shall be stored at step 104, for a definite period of time on the local stack, based on the type of the page. For instance, if the type of the page is of the transient entry type or the combinational entry, the page is usually stored temporarily on the local stack, till a page of the type permanent entry or combination entry is encountered. A page of the type combination entry is a page that is of the type transient and permanent. Further, a page of the type combination entry shall be stored in the local stack until a page of the type combination entry or permanent entry is encountered, and stored in the local stack. In another instance, if the type of the page is of the permanent entry type, the page is usually stored permanently in the local stack until the application is terminated. A page of the type null entry is usually not stored on the local stack. At step 106, usage of the local stack can be determined based on an action performed on the page by a user of the application.

Figure 2:
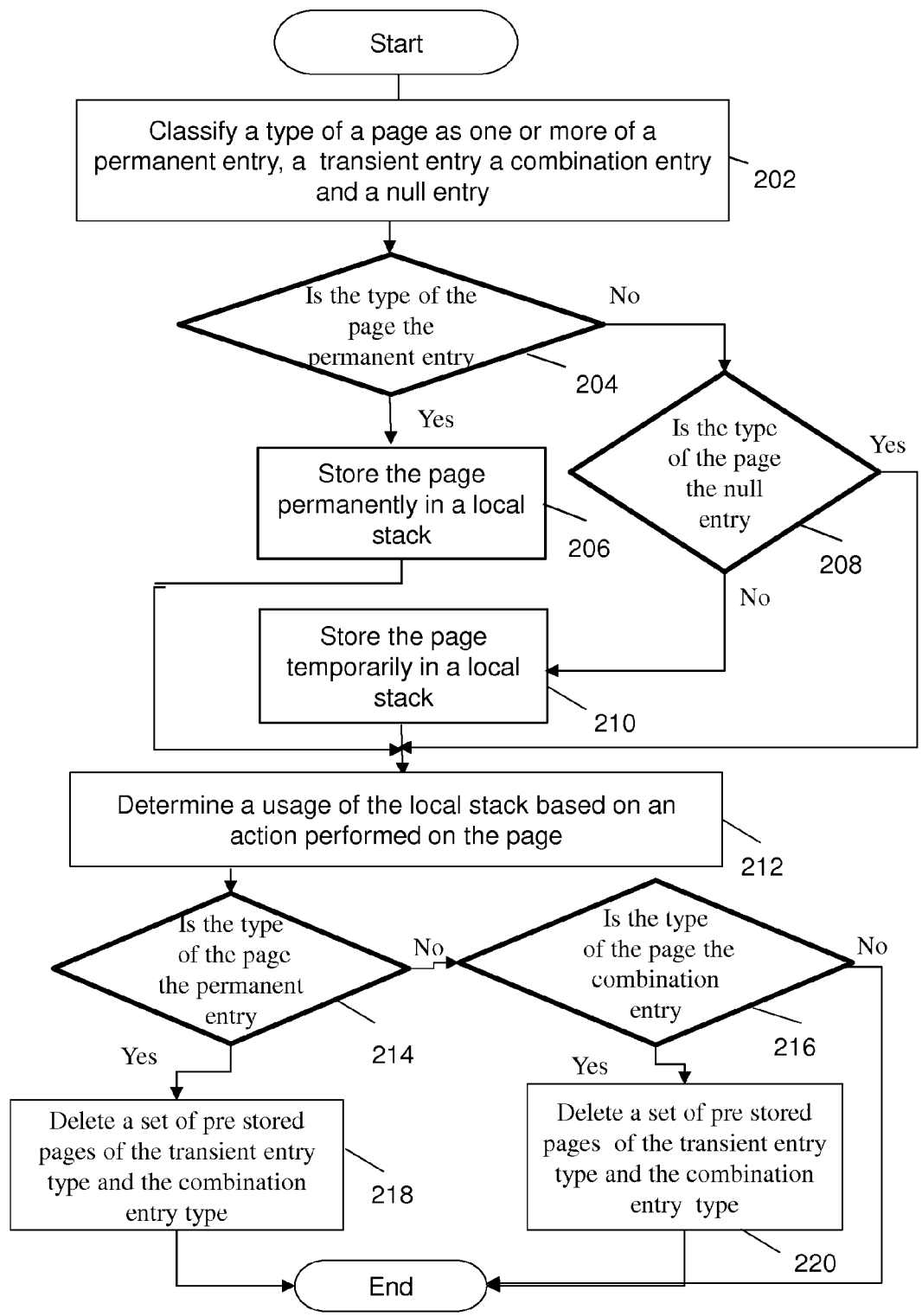
FIG. 2 is a flowchart illustrating a preferred embodiment of a method for managing a local stack.

FIG. 2 illustrates an alternate embodiment of practicing the invention. At step 202, a type of a page, to be accessed for an application being run on a portable device such as a mobile handset, can be classified as a permanent entry, a transient entry, a combination entry or a null entry. At step 204, if the page is validated to be of the permanent entry type, the page can be stored permanently on the local stack at step 206. However, if the page is not of the permanent entry type, then at step 208, the page can be checked for the null entry type. In an event the page is of the null entry type, then the page shall not be stored on the local stack. The null entry page usually refers to error message pages, which can be accessed from a server when required. Alternatively, if the page is not of the null entry type, then the page is either a transient entry type or the combination entry type. If the page is of the transient entry type or the combination entry type, the page shall be stored temporarily on the local stack at step 210. At step 212, a usage of the local stack shall be determined based on an action performed on the page. As a page is stored on the local stack, a set of pre stored pages of the local stack maybe deleted based on the type of the page and the type of the pre stored pages. For instance, at step 214, if the type of the page is the permanent entry, the set of pre stored pages shall be deleted, at step 218, if the type of the set of pre stored pages are of the combination entry or the transient entry. Alternatively, if the type of page is the combination entry, then at step 220, the page can be deleted if the type of the set of pre stored pages are of the transient entry or the combination entry. If the type of the page is the transient entry or the null entry type then the set of pre stored pages shall not be deleted. In the disclosed embodiment, an instance of the transient entry page can be an intermediate resultant page, which need not be accessed again during processing of a workflow request once another permanent entry type or another combination entry type page is accessed. In the disclosed embodiment, the combination entry page can refer to a confirmation page of the resultant workflow or an intermediate resultant page that refers logical end of the workflow. The combination entry page usually shall not be accessed once another combination entry type or another permanent entry type page is accessed. As a result the combination entry page, once stored in the local stack, must delete the pre stored transient pages, and the combination entry page may itself continue to be on the local stack, till another combination entry type or the permanent entry type page is accessed.

In an alternate embodiment, consider an application having 'n' (Page_1 . . . Page_n) number of pages. The application may involve a set of transactions such as Balance Enquiry and Fund Transfer. The application can be a thick client application, wherein the application shall maintain certain essential pages in a local stack to reduce information traffic over the air, while communicating with a server. Based on a usage scenario, another set of pages may need to be referenced from the server even though a copy of the set of pages is present in the local stack. In the disclosed embodiment, Page 1, stands for a login page, where a user of the application shall enter his login credentials, and from where access to the application may be given once the login credentials are verified, Page 2, refers to a menu page, displaying a set of options available within the application for the verified user, page 3 refers to a fund transfer page, where the verified user may select a payee for transferring funds, Page 4, refers to an internal page of the fund transfer page, where the verified user may enter an amount to be fund transferred and a transaction password, page 5 refers to a confirmation page, prompting the verified user to confirm details of the fund transfer, and page 6 refers to a confirmation receipt page, where a confirmation message is provided to the verified user of a successful or failed fund transfer. In a given workflow of a fund transfer operation, from the page 3 to page 6, an error may occur, to which an error page, Page n, needs to be displayed to the verified user indicating an error in operation. The error page, Page n, is usually not a part of the workflow and hence can be referenced from the server, when required. The error page is usually not stored in the local stack, and is marked as a null entry type page, a page that does not enter in the local stack. On the menu page 2, a balance enquiry option may be available, which when clicked may show the verified user a list of receipts on Page 7, details of each receipt maybe further shown in an internal page 8.

Figure 4:
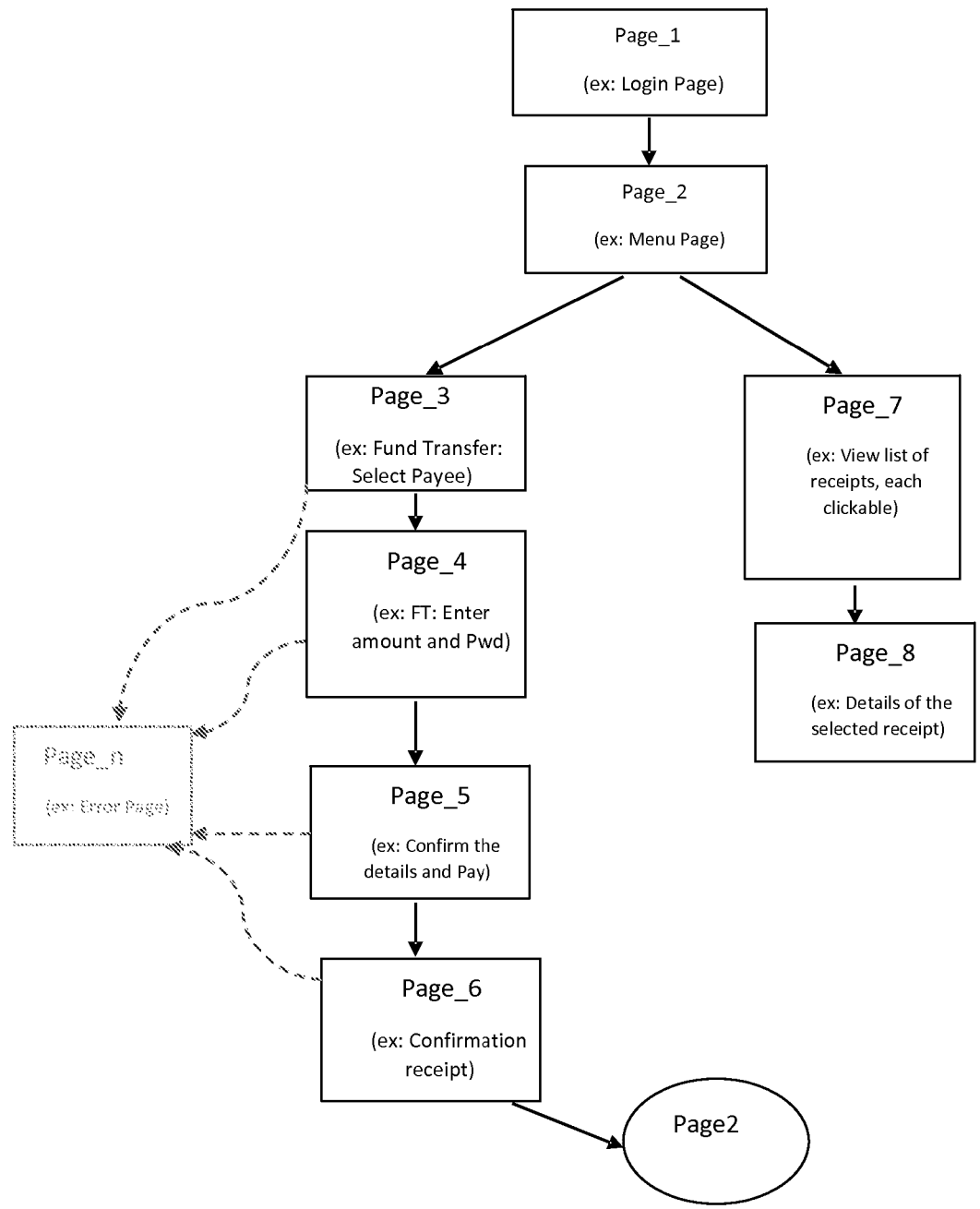
FIG. 4 illustrates a workflow in diagrammatic format.

In a normal workflow, the verified user may move from page 2 to page 6. On page 6, if the verified user clicks on the back button, as per the application logic, there is a need to show page 2 or page 3, rather than page 5, hence page 1, page 2, and page 6 are stored as permanent entry type pages on the local stack, whereas page 3, page 4 and page 5 are stored as transient entry type pages. As a result, page 3, page 4 and page 5 shall be used only for handling an error page, Page n, when one or more error conditions occur while moving from page 3 through page 5. The error page, Page n is not stored on the local stack. The transient entry type pages, should not be accessed when the verified user clicks on the back button on page 6, hence, the logic embedded into the stack, is to delete the transient type page from the local stack when page 6, is accessed. The page 6, is usually set as a combination entry type page. The page 6 needs to be present in the stack to show the confirmation message or a logical end of the workflow, till another workflow is initiated, and it needs to delete the earlier entry pages, that resulted in the confirmation message, as returning to intermediary pages may result in illogical conclusions and errors in the workflow. Thus a page is usually set as a combination page, when it results in a logical end of a workflow, and when its presence on the stack is not required when another workflow of the application is initiated. Further, page 1 and page 2, are stored permanently on the local stack, as presence of such pages as essential when the verified user intends to go back, when the logical end on a workflow has been reached. Permanent entry type pages are those pages of an application whose presence in the local stack, are essential for more than one workflows of the application. The workflow may be depicted in a diagrammatic format as shown in FIG. 4.

Figure 3:
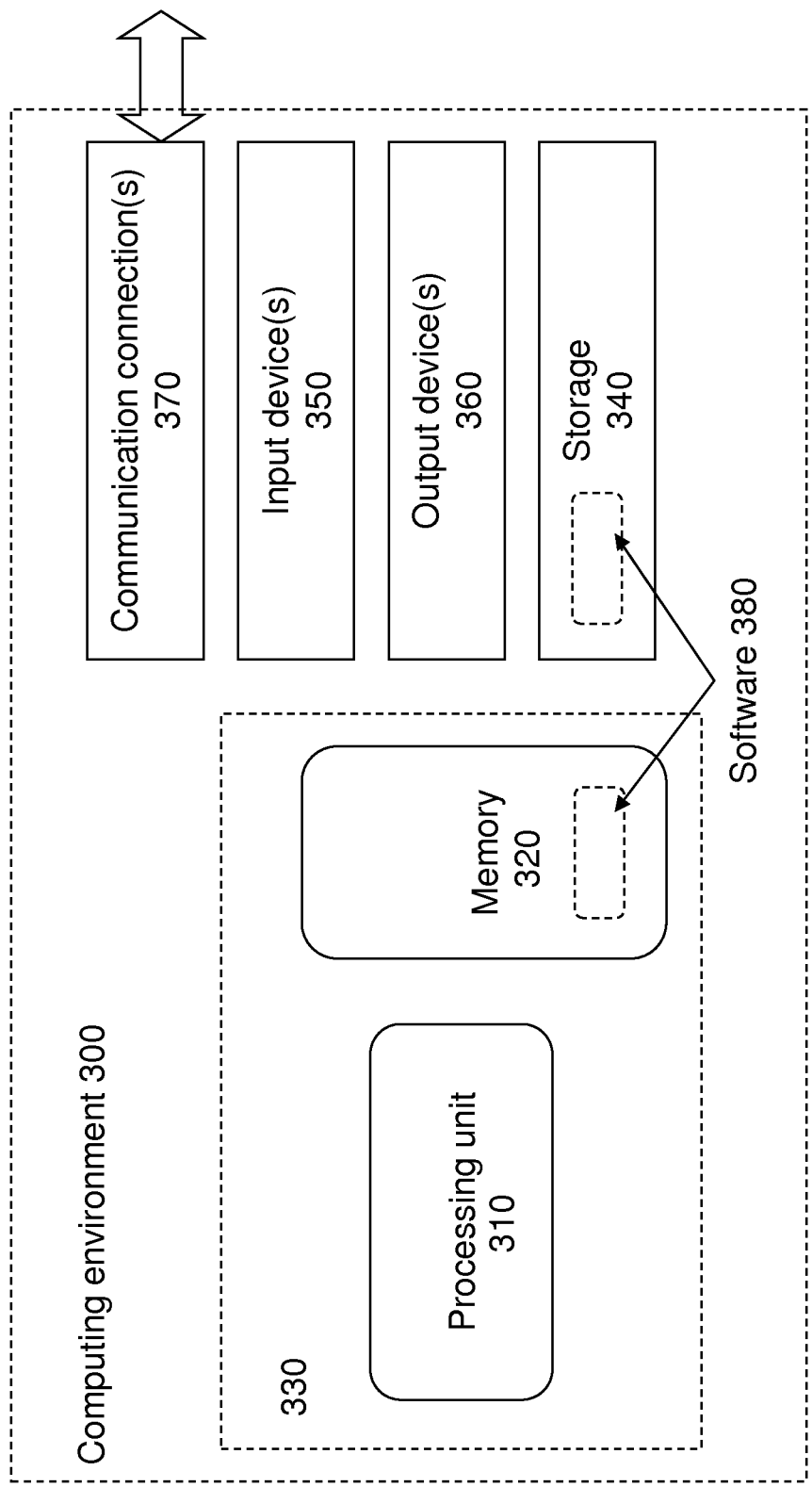
FIG. 3 illustrates a generalized example of a computing environment 300.

One or more of the above-described techniques can be implemented in or involve one or more computer systems. FIG. 3 illustrates a generalized example of a computing environment 300. The computing environment 300 is not intended to suggest any limitation as to scope of use or functionality of described embodiments.

With reference to FIG. 3, the computing environment 300 includes at least one processing unit 310 and memory 320. In FIG. 3, this most basic configuration 330 is included within a dashed line. The processing unit 310 executes computer-executable instructions and may be a real or a virtual processor. In a multi-processing system, multiple processing units execute computer-executable instructions to increase processing power. The memory 320 may be volatile memory (e.g., registers, cache, RAM), non-volatile memory (e.g., ROM, EEPROM, flash memory, etc.), or some combination of the two. In some embodiments, the memory 420 stores software 480 implementing described techniques.

A computing environment may have additional features. For example, the computing environment 300 includes storage 340, one or more input devices 340, one or more output devices 360, and one or more communication connections 370. An interconnection mechanism (not shown) such as a bus, controller, or network interconnects the components of the computing environment 300. Typically, operating system software (not shown) provides an operating environment for other software executing in the computing environment 300, and coordinates activities of the components of the computing environment 300.

The storage 340 may be removable or non-removable, and includes magnetic disks, magnetic tapes or cassettes, CD-ROMs, CD-RWs, DVDs, or any other medium which can be used to store information and which can be accessed within the computing environment 300. In some embodiments, the storage 340 stores instructions for the software 380.

The input device(s) 350 may be a touch input device such as a keyboard, mouse, pen, trackball, touch screen, or game controller, a voice input device, a scanning device, a digital camera, or another device that provides input to the computing environment 300. The output device(s) 360 may be a display, printer, speaker, or another device that provides output from the computing environment 300.

The communication connection(s) 30 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 400, computer-readable media include memory 420, storage 440, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

While the foregoing has described certain embodiments and the best mode of practicing the invention, it is understood that various implementations, modifications and examples of the subject matter disclosed herein may be made. It is intended by the following claims to cover the various implementations, modifications, and variations that may fall within the scope of the subject matter described.

We claim:

1. A method of managing a local stack, the method comprising:
   classifying a type of a page as one or more selected from the group consisting of a permanent entry, a transient entry, a combination entry, and a null entry;
   storing the page in a local stack for a definite period, wherein the page is deleted from the local stack when another page is accessed based on a type of the page and a type of the other page accessed;
   determining a usage of the local stack based on an action performed on the page; and
   responsive to receipt of backward navigation from a user interface, skipping over the deleted page.

2. The method of claim 1, wherein the step of storing the page further comprises:
   storing the page permanently in the local stack, when the type of the page is the permanent entry; and
   storing the page temporarily in the local stack, when the type of the page is one or more of the transient entry and the combination entry.

3. The method of claim 1, wherein the combination entry refers to a page of the permanent entry type and the transient entry type.

4. The method of claim 1, wherein the page of the type null entry represents an error page.

5. The method of claim 1, wherein the page of the type transient entry represents an intermediate result page accessed during a workflow.

6. The method of claim 1, wherein the page of the combination entry type represents one or more of an intermediate resultant page and a confirmation page accessed during a workflow.

7. The method of claim 1 wherein:
   the page is one of a plurality of pages composing a workflow; and
   the page is deleted responsive to determining that the page is a transient entry page of the workflow.

8. A method of managing a local stack, the method comprising:
   classifying a type of a page as one or more selected from the group consisting of a permanent entry, a transient entry, a combination entry, and a null entry;
   storing the page in a local stack for a definite period based on the type of the page;
   determining a usage of the local stack based on an action performed on the page;
   deleting a set of pre stored pages of the transient entry and the combination entry type from the local stack, when a page of the permanent entry type is accessed;
   deleting a set of pre stored pages of the transient entry and the combination entry type from the local stack, when a page of the combination entry type is accessed; and
   responsive to receipt of backward navigation from a user interface, skipping over the deleted pages.

9. A computer program product comprising a plurality of program instructions stored on a non-transitory computer-readable medium that, when executed by a computing device, performs a method of managing a local stack, the method comprising:

classifying a type of a page as one or more of a permanent entry, a transient entry, a combination entry, and a null entry;

storing the page in a local stack for a definite period based on the type of the page;

determining a usage of the local stack based on an action performed on the page;

deleting a set of pre stored pages of the transient entry and the combination entry type from the local stack, when a page of the permanent entry type is accessed;

deleting a set of pre stored pages of the transient entry and the combination entry type from the local stack, when a page of the combination entry type is accessed; and responsive to receipt of backward navigation from a user interface, skipping over the deleted pages.

10. The computer program product of claim 9, wherein the step of storing the page further comprises:

storing the page permanently in the local stack, when the type of the page is the permanent entry; and storing the page temporarily in the local stack, when the type of the page is one or more of the transient entry and the combination entry.

11. The computer program product of claim 9, wherein the combination entry refers to a page of the permanent entry type and the transient entry type.

12. The computer program product of claim 9, wherein the page of the type null entry represents an error page.

13. The computer program product of claim 9, wherein the page of the type transient entry represents an intermediate result page accessed during a workflow.

14. The computer program product of claim 9, wherein the page of the combination entry type represents one or more of an intermediate resultant page and a confirmation page accessed during a workflow.

* * * * *